Figure 1:
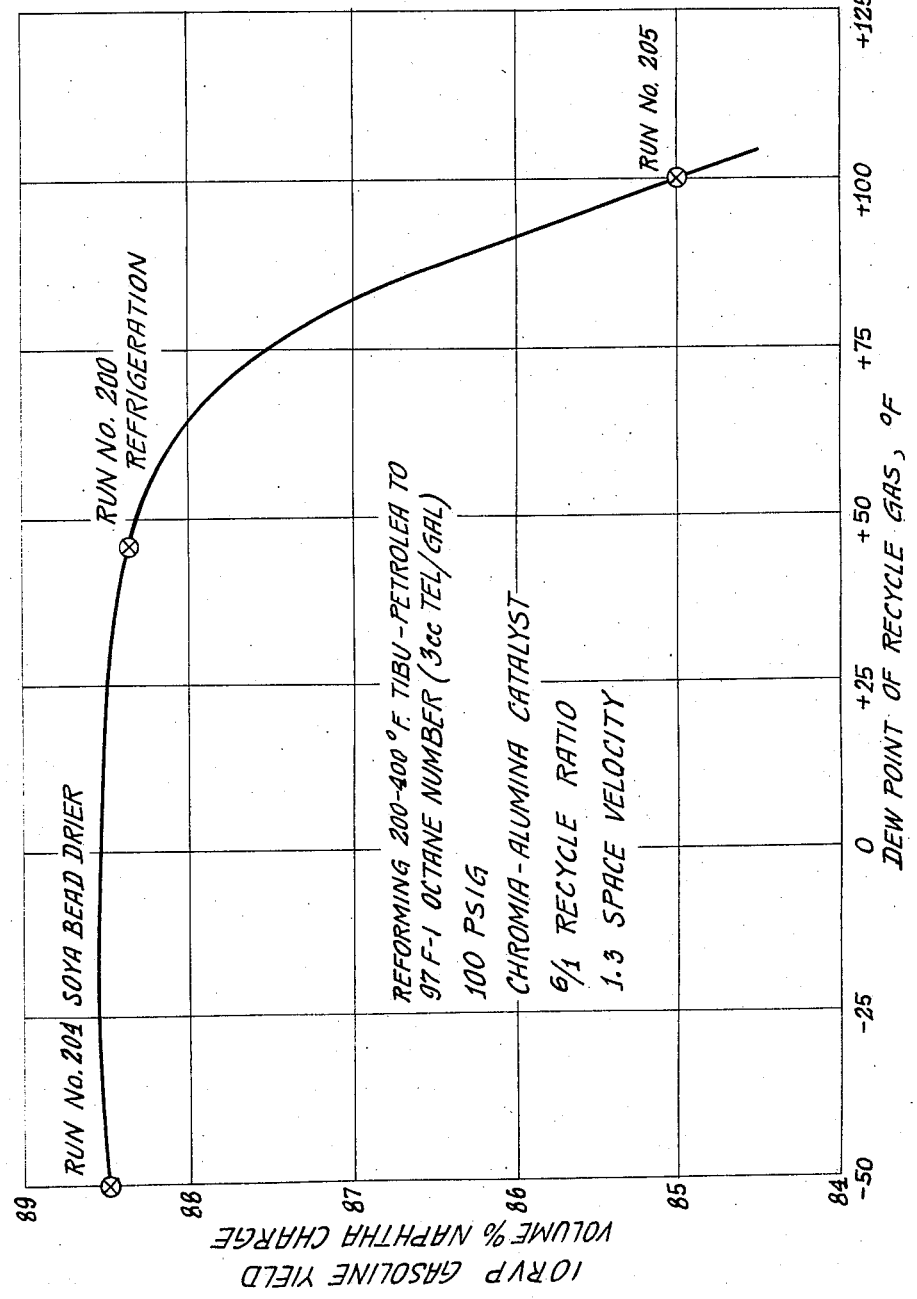

INVENTORS
Kenneth M. Elliott
BY Winton W. Hamilton
Francis F. Johnston
AGENT

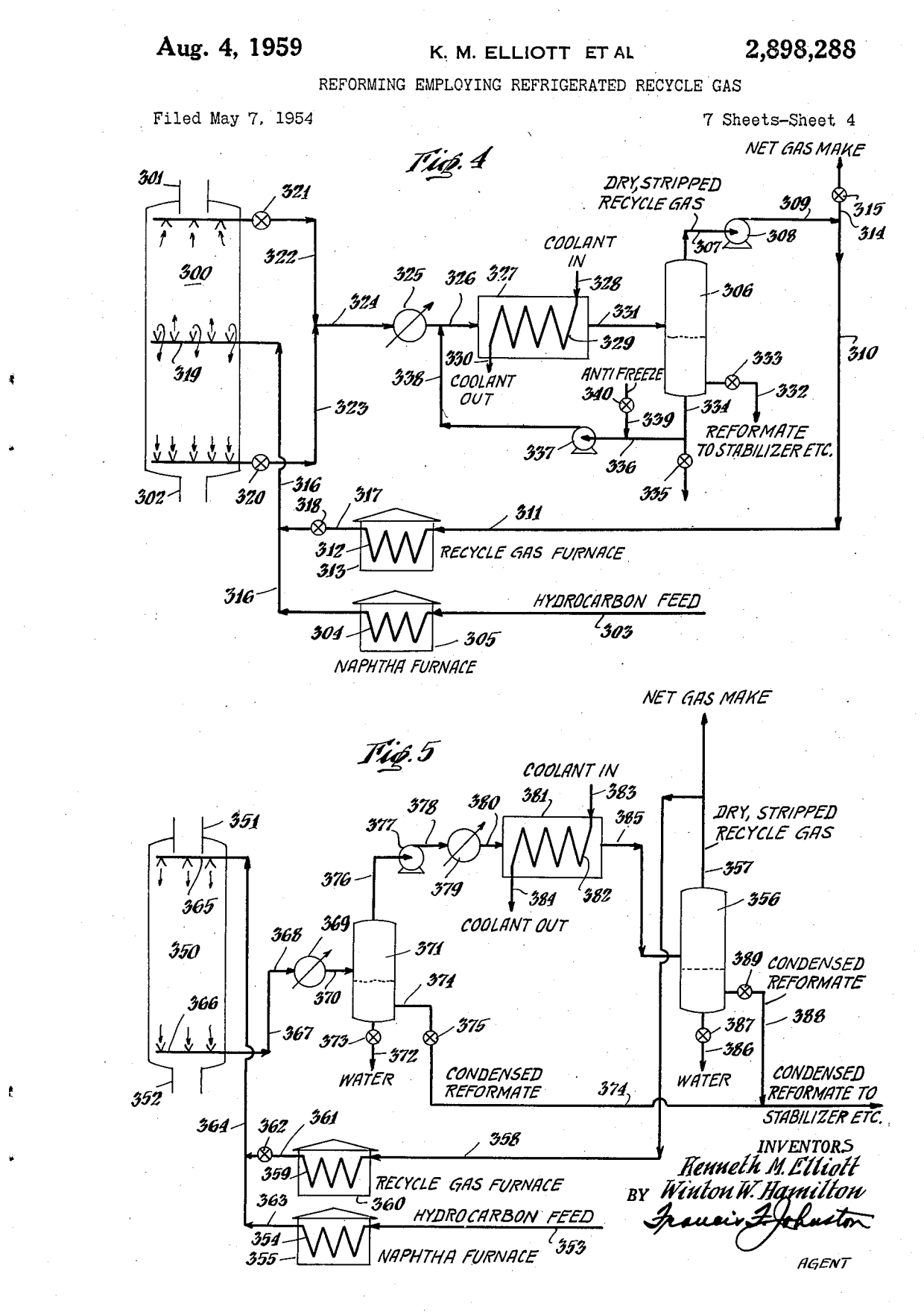

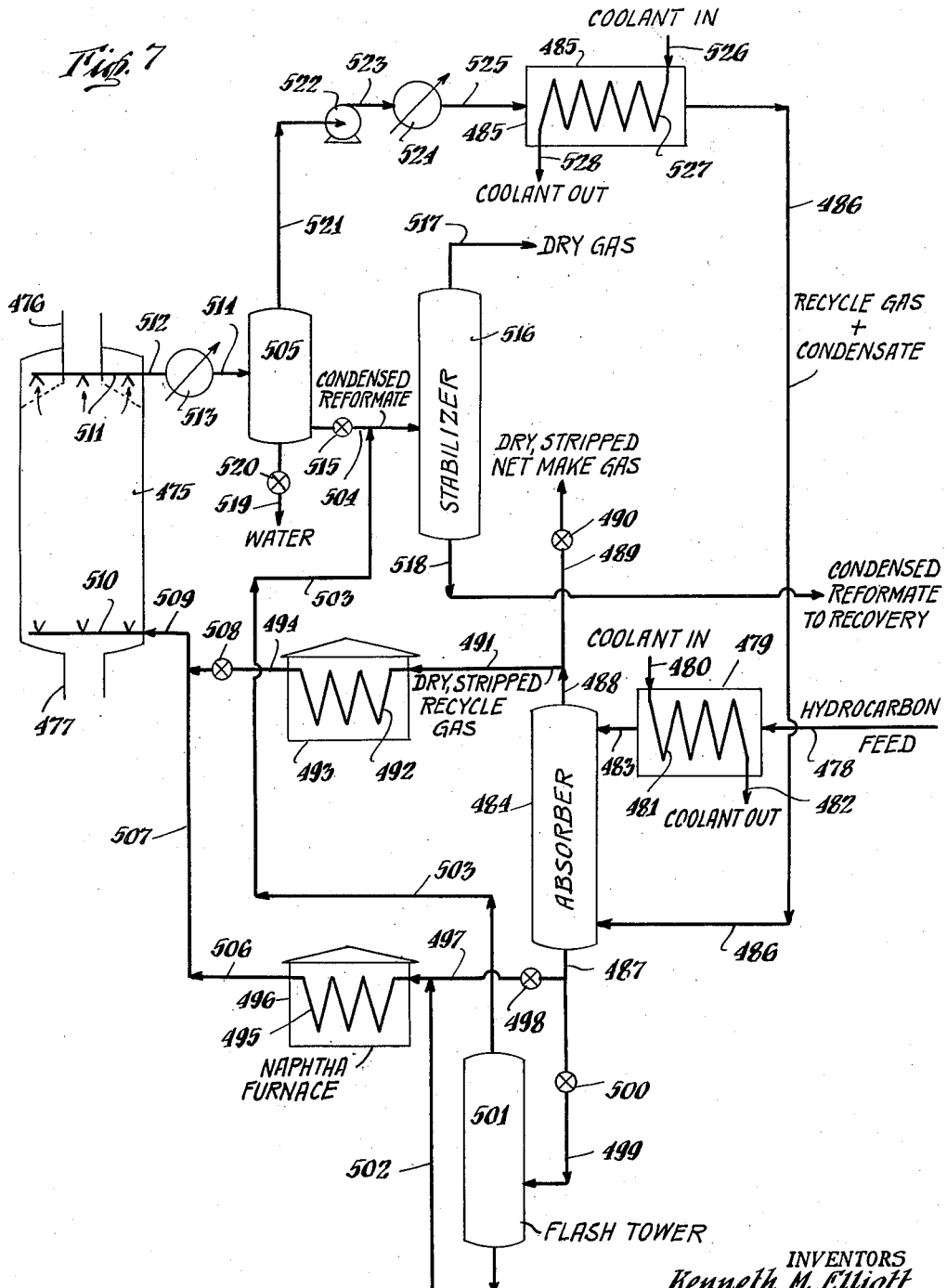

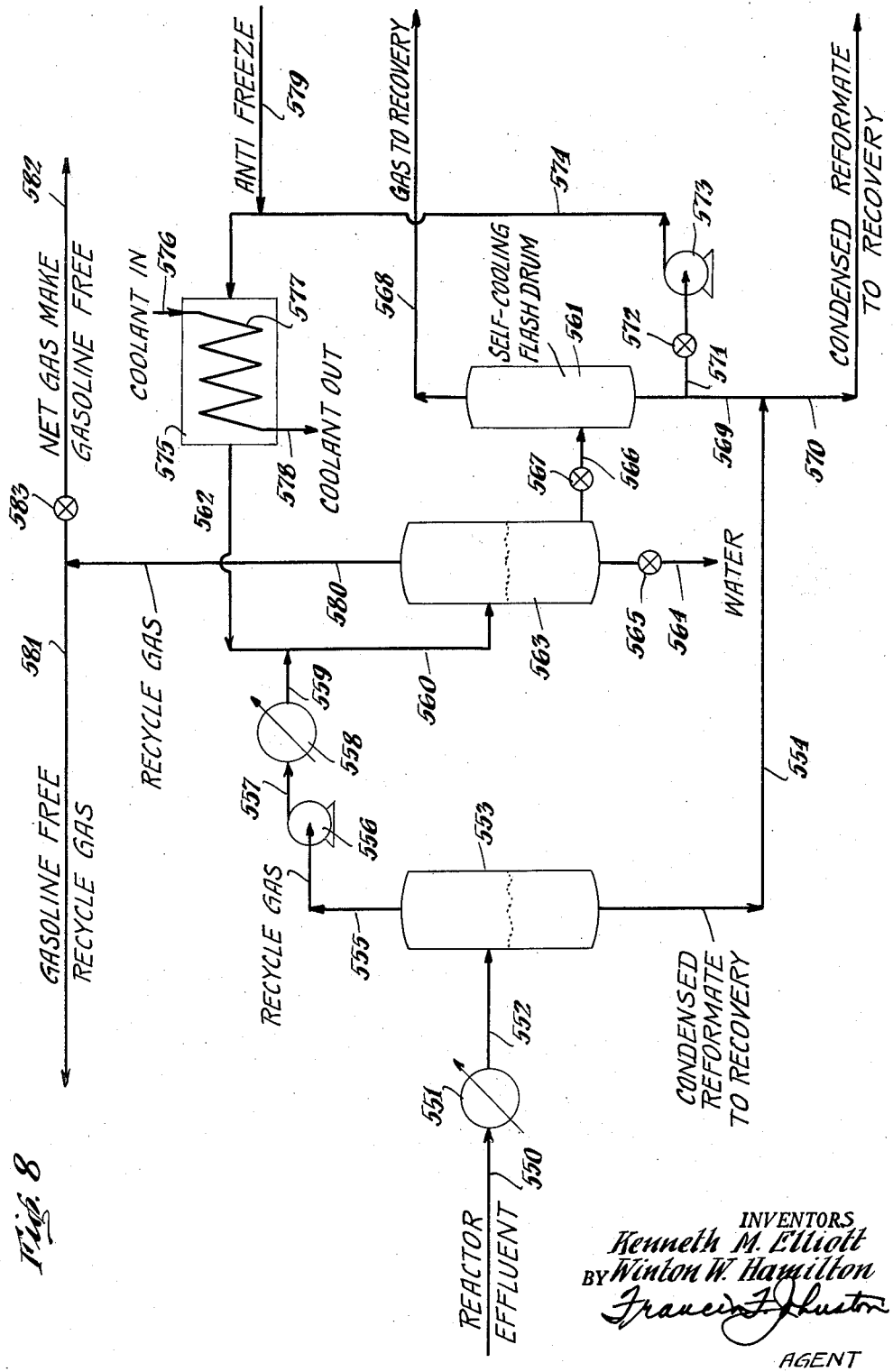

2,898,288

REFORMING EMPLOYING REFRIGERATED
RECYCLE GAS

Kenneth M. Elliott, Woodbury, and Winton W. Hamilton, Pitman, N.J., assignors to Socony Mobil Oil Company, Inc., a corporation of New York Application May 7, 1954, Serial No. 428,284

16 Claims. (Cl. 208—134)

The present invention relates to reforming hydrocarbons and, more particularly, to reforming hydrocarbons employing a recycle gas of low moisture content and of low concentration of $C_4$ and higher boiling hydrocarbons.

Reforming is the designation given to the total effect of the molecular changes, isomerization, hydrogenation, dehydrogenation and dehydroaromatization, upon the characteristics of a mixture of hydrocarbons subjected to reforming conditions. Reforming can be of two types, (1) thermal in the absence of a known catalyst and (2) catalytic in the presence of catalysts known to accelerate one or more of the foregoing molecular changes. The most widely used application of reforming is in the treatment of naphthas to raise the octane rating of the fraction.

Since the feed to a reforming unit is a fraction obtained either by distillation of the crude (straight-run gasoline), by cracking of a fraction derived from a crude (cracked gasoline) or a mixture of the two, straight-run naphtha and cracked naphtha, it is manifest that for economic reasons it is essential to operate a reforming process to produce the highest yield compatible with producing a reformed gasoline of required octane number.

It has been found that the yield of gasoline of required octane number is affected by the moisture in praesenti or potential associated with the active catalyst introduced into a reforming reactor operating with a moving bed of catalyst. This yield is also affected by the moisture content of the hydrocarbon feed and the gaseous heat carrier introduced into the reaction zone. Furthermore, this yield is affected by the concentration of hydrocarbons having 4 or more carbon atoms in the gaseous heat carrier when the gaseous heat carrier is preheated to temperatures above about 1100° to about 1150° F.

Solutions to the problem of increasing the yield of gasoline of required octane rating when using catalyst which during the reaction increases the moisture content of the reaction zone above that of the mixture of hydrocarbon feed and gaseous heat carrier are disclosed in the co-pending applications for United States Letters Patent, Serial No. 285,484, filed May 1, 1952, now U.S. Patent No. 2,763,598, issued September 18, 1956, in the name of Kenneth M. Elliott, and Serial No. 333,901, filed January 29, 1953, now U.S. Patent No. 2,756,190, issued July 24, 1956, in the name of Kenneth M. Elliott. However, the problem of conditioning the gaseous heat carrier to increase the yield of gasoline of required octane number has not been completely solved in a single simple manner effective to provide a gaseous heat carrier having not only the desired low moisture content but also the desired low concentration of hydrocarbons having four or more carbon atoms.

The effect of the moisture content of the gaseous heat carrier, usually recycle gas containing at least 25 volume percent hydrogen, upon the yield of gasoline having a 10 pound Reid vapor pressure (10 R.V.P. gasoline) is graphically illustrated by the graph presented as Figure 1 of the drawings.

The curve of Figure 1 illustrates the effect of the moisture content expressed as the dew-point of the recycle gas upon the yield of 10 R.V.P. gasoline having an octane number of 97 (F-1+3 cc. TEL/gal.). As the dew-point of the recycle gas is lowered from +100° F. (0.8 mol percent water at 100 p.s.i.g. total pressure) to a dew-point of −50° F., the yield of 97 O.N 10 R.V.P. gasoline increases from 85 percent of the charge to 88.5 percent of the charge. However, it will be noted that there is no significant increase in yield below a dew-point of +25° F. Consequently, the recycle gas or gaseous heat carrier can be cooler to a dew-point of 40° to about 60° F. and the yield of 10 R.V.P. gasoline increased to about 3 to about 3.5 percent.

An increase in yield of 3 percent may appear to be insignificant. However, for a reforming unit treating 10,000 barrels of naphtha per day an increased yield of 97 O.N. 10 R.V.P. gasoline of 3 percent represents increased yield of about 90,000 barrels of 10 R.V.P. gasoline per year.

The effect of reducing the concentration in the gaseous heat carrier or recycle gas of hydrocarbons having four or more carbon atoms in the molecule is not so obvious but equally important. Reforming is an endothermic reaction. Therefore, the heat of reaction must be supplied to the reaction zone from some extraneous source. For various reasons it is desirable to supply the required heat of reaction partly in the catalyst entering the reactor, partly in the hydrocarbon feed and partly in the gaseous heat carrier. Mechanical difficulties are encountered when trying to supply all or a major portion of the required heat of reaction in the catalyst introduced into the reactor. Of course, when employing a static catalyst bed none of the required heat of reaction can be supplied in the catalyst since no hot catalyst is introduced into the reactor during the reaction. When an attempt is made to supply a large portion of the required heat of reaction in the hydrocarbon feed to the reaction zone it is necessary to heat the hydrocarbon feed to temperatures at which thermal cracking and/or reforming take place. Since the products of thermal cracking and/or reforming have lower octane ratings than the products of catalytic reforming it is manifest that these thermal reactions must be avoided. It follows that the gaseous heat carrier is a desirable carrier of the heat energy required for the reaction. A modicum of the required heat of reaction can be supplied by heating the gaseous heat carrier or recycle gas to temperatures of about 1100° F. However, much more satisfactory operations result when the gaseous heat carrier or recycle gas is heated to 1200° to about 1300° F. However, at temperatures of 1200° to about 1300° F. hydrocarbons, having four or more carbon atoms in the molecule, crack to carbon which is at least in part deposited in the heating furnace lowering its efficiency. Cracking of the hydrocarbons having four or more carbon atoms in the molecule lowers the yield of 10 R.V.P. gasoline. The effect of cracking of the $C_4$ and $C_{4+}$ hydrocarbons in the recycle gas heating furnace is obvious from the data presented in Table I.

Table I

| Recycle Gas Furnace Temp., ° F. | 1,150 | 1,200 |
|---|---|---|
| Loss of Gasoline due to Cracking in Recycle Gas Furnace, Vol. Percent Charge | 1.2 | 2.7 |
| Loss Bbl./day/10,000 b.p.d. charge | 120 | 270 |
| Percent Recycle Gas Content Cracked: | | |
| $C_4$ hydrocarbon, percent | | 9.4 |
| $C_5$ hydrocarbon, percent | | 12.2 |
| $C_6$ hydrocarbon, percent | | 31.1 |

The foregoing data were obtained for recycle gas separated from the reactor effluent at 100° F. and recycled through the recycle gas heating furnace at a rate to supply 6 mols of recycle gas per mol of naphtha to be reformed. When the recycle gas heating furnace is operated at 1100° F. substantially no loss of $C_4$ and $C_{4+}$ hydrocarbons is sustained due to cracking.

Figure 2:
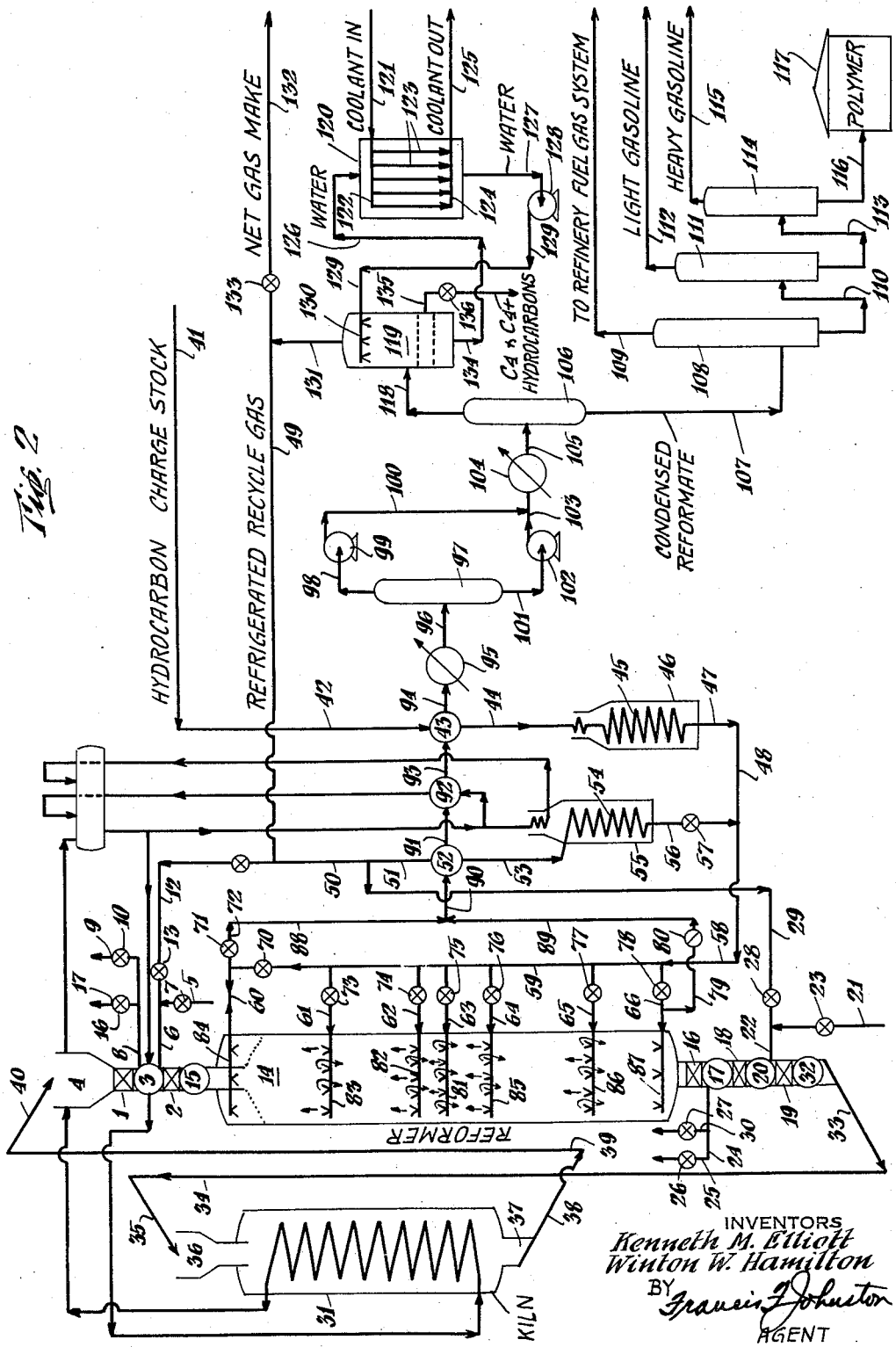
Figure 3:
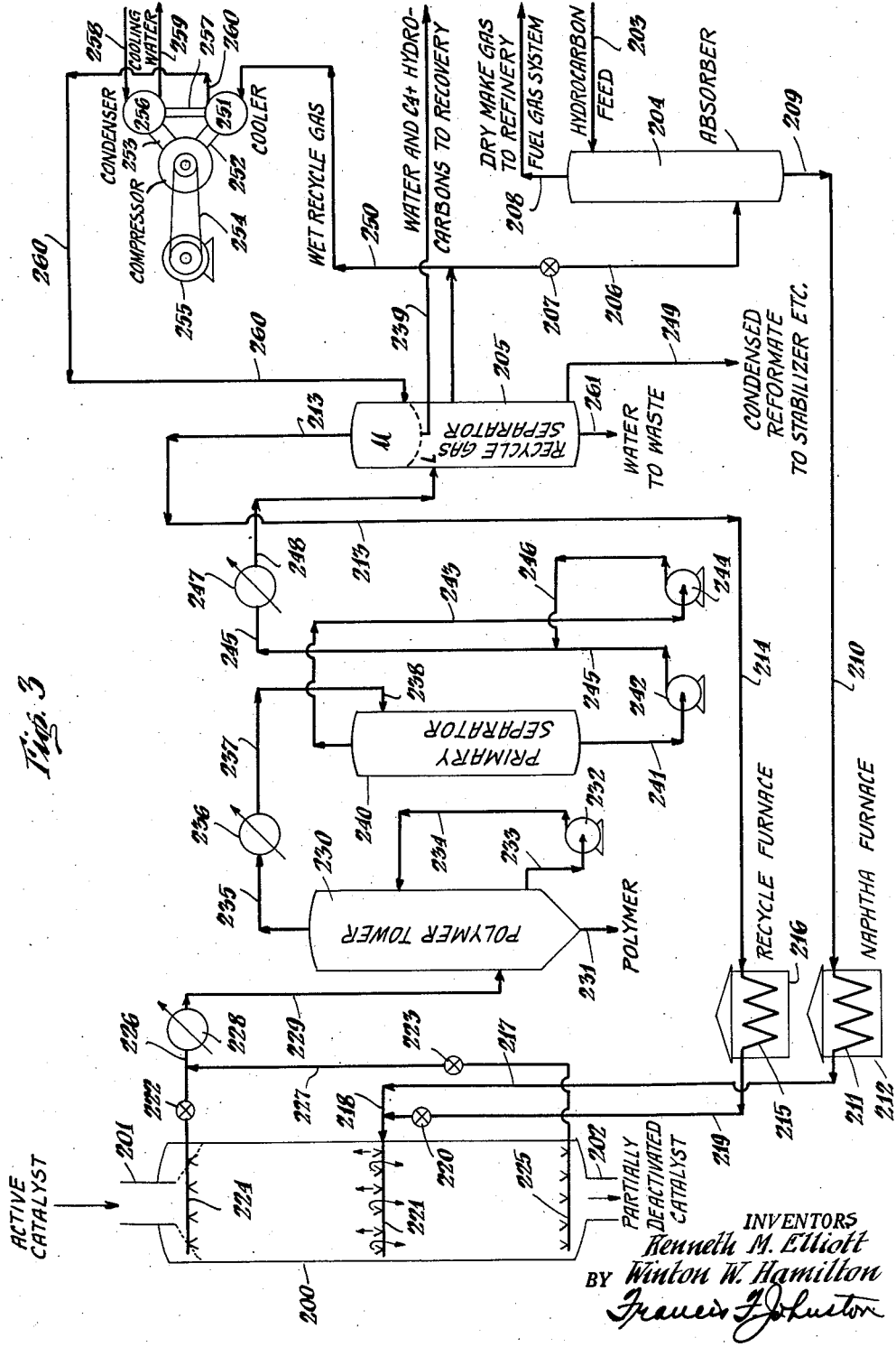
Figure 6:
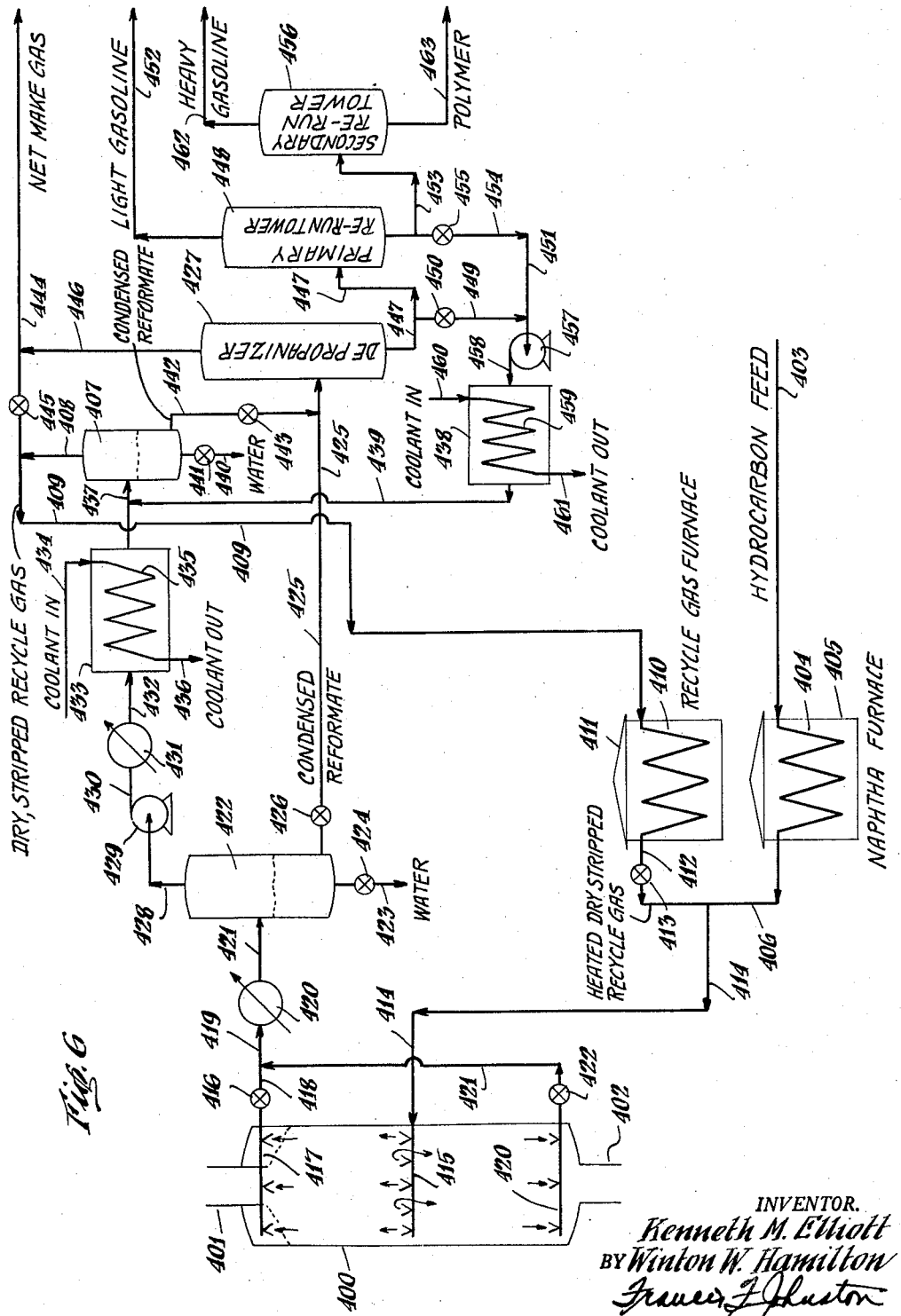

Accordingly, the present invention provides a method of reforming hydrocarbons employing a gaseous heat carrier having a water dew-point of not more than about 60° F. to about 25° F. and preferably about 35° to about 50° F. and a concentration of $C_4$ and $C_{4+}$ hydrocarbons not greater than about 4 mol percent. Therefore, it is an object of the present invention to provide a means of increasing the yield of 10 R.V.P. gasoline from a reforming reaction by removing water, $C_4$ and $C_{4+}$ hydrocarbons from the gaseous heat carrier or recycle gas wherein the total effluent from the reactor is cooled to a temperature of 60° F. or lower upstream of the recycle gas heating furnace. It is another object of the present invention to provide a means of increasing the yield of 10 R.V.P. gasoline from a reforming reaction by removing water, $C_4$ and $C_{4+}$ hydrocarbons from the gaseous heat carrier or recycle gas wherein the recycle gas only is cooled to a temperature of 60° F. or below upstream of the recycle gas heating furnace. It is a further object of the present invention to provide a means of increasing the yield of 10 R.V.P. gasoline from a reforming reaction by removing water, $C_4$ and $C_{4+}$ hydrocarbons from the gaseous heat carrier or recycle gas wherein the recycle gas only is cooled to a temperature of 60° F. or below and the cooled recycle gas is contacted with a cooled absorbent for $C_4$ and heavier hydrocarbons. The present invention also includes a means of increasing the yield of 10 R.V.P. gasoline from a reforming reaction by removing water, $C_4$ and $C_{4+}$ hydrocarbons from the gaseous heat carrier or recycle gas wherein the gaseous heat carrier or recycle gas after the temperature thereof has been lowered to at least 60° F. is contacted with hydrocarbon feed cooled to about the same temperature as the cooled recycle gas. It is also an object of the present invention to provide for cooling either through direct heat exchange relation of a refrigerant and the total effluent or recycle gas to be cooled or by indirect heat exchange relation in which a heat transfer medium such as water, or water containing an anti-freeze or a hydrocarbon absorbent for $C_4$ and $C_{4+}$ hydrocarbons is cooled by indirect heat exchange relation with a refrigerant and the total effluent or recycle gas is cooled by direct heat exchange relation with the aforesaid heat transfer medium. These and other objects and advantages will become apparent to those skilled in the art from the following description taken in conjunction with the drawings in which:

Figure 2 is a highly schematic flow-sheet illustrating a method of increasing the yield of gasoline from a reforming reaction by removing water, $C_4$ and $C_{4+}$ hydrocarbons from the gaseous heat carrier or recycle gas wherein the total non-condensed portion of the effluent from the reforming reactor, i.e., recycle gas, is cooled to temperatures such that a major portion of the water and $C_4$ and $C_{4+}$ hydrocarbons are condensed by direct heat exchange with a liquid heat transfer medium and the condensate so produced separated from the recycle gas upstream of the recycle gas heating furnace;

Figure 3 is a highly schematic flow-sheet illustrating a method of increasing the yield of gasoline from a reforming reaction by removing water, $C_4$ and $C_{4+}$ hydrocarbons from the gaseous heat carrier or recycle gas wherein the readily condensed portion of the reformer effluent is used as an absorbent for the less readily condensed portion of the reformer effluent and the recycle gas is subjected directly to indirect heat exchange with a cooling medium;

Figure 4 is a highly schematic flow-sheet illustrating a method of increasing the yield of gasoline from a reforming reaction by removing water, $C_4$ and $C_{4+}$ hydrocarbons from the gaseous heat carrier or recycle gas wherein the total reformer effluent is brought into indirect heat exchange with a coolant;

Figure 5 is a highly schematic flow-sheet illustrating a method of increasing the yield of gasoline from a reforming reaction by removing water, $C_4$ and $C_{4+}$ hydrocarbons from the gaseous heat carrier or recycle gas wherein the total less readily condensed portion of the reformer effluent is brought into indirect heat exchange relation with a coolant, separating water from the condensate thus produced and admixing the hydrocarbons thus condensed with the more readily condensed hydrocarbons;

Figure 6 is a highly schematic flow-sheet illustrating a method of increasing the yield of gasoline from a reforming reaction by removing water, $C_4$ and $C_{4+}$ hydrocarbons from the gaseous heat carrier or recycle gas wherein the total reformer effluent is brought into indirect heat exchange relation with a coolant, the cooled total reformer effluent admixed with a cooled hydrocarbon such as the bottoms from the depropanizer and/or primary rerun tower, the portion of the reformer effluent not condensed under the existing conditions of temperature and pressure separated from the condensate and transferred at least in part to the recycle gas heating furnace while water is separated from hydrocarbon condensate including the aforementioned bottoms and the hydrocarbon condensate depropanized and fractionated. It will be noted that in this method the gaseous overhead from the depropanizer passes to the refinery fuel gas system;

Figure 7 is a highly schematic flow-sheet illustrating a method of increasing the yield of gasoline from a reforming reaction by removing water, $C_4$ and $C_{4+}$ hydrocarbons from the gaseous heat carrier or recycle gas wherein the total less readily condensed portion of the reformer effluent is brought into indirect heat exchange relation with a coolant and the cooled, less readily condensed portion of the reformer effluent is contacted with hydrocarbon feed to the reformer which has been cooled previous to contact with the cooled gaseous reformer effluent; and Figure 8 is a highly schematic flow-sheet illustrating a method of increasing the yield of gasoline from a reforming reaction by removing water, $C_4$ and $C_{4+}$ hydrocarbons from the gaseous heat carrier or recycle gas wherein the recycle gas is admixed with a cooled absorbent for the $C_4$ and $C_{4+}$ hydrocarbons present in the recycle gas at a temperature such that water is condensed and $C_4$ and $C_{4+}$ hydrocarbons absorbed.

In general, the present invention is concerned primarily not with the catalysts or the reaction temperatures and pressures or space velocities required to produce a gasoline of required octane rating, but with modification of existing reforming procedures whereby the yield of gasoline of required octane rating can be increased by reducing to a practical minimum the moisture content of the gaseous heat carrier or recycle gas and simultaneously reducing to a practical minimum the concentration of $C_4$ and $C_{4+}$ hydrocarbons in the recycle gas prior to passing the recycle gas through the recycle gas heating furnace (hereinafter designated recycle gas furnace). Consequently, since the catalysts suitable for reforming are known to those skilled in the art and since the reforming conditions of temperature, pressure and space velocity are known to those skilled in the art there is no need to discuss these factors which are primarily immaterial to an understanding of the principles of the present invention. It suffices to state that the temperatures, pressures, hydrogen-to-charge stock ratio and space velocities required to produce a gasoline of required octane rating are known to those skilled in the art for each reforming catalyst. Accordingly, the description of the present invention provided hereinafter is illustrated in terms of one type of catalyst and the reforming conditions required in conjunction with that catalyst to produce gasolines having high octane rating at yields greater than can be obtained with the same catalyst under the same reforming conditions when the concentrations of water, $C_4$ and $C_{4+}$ hydrocarbons in the gaseous heat carrier or recycle gas are not reduced to a practical minimum. It will be noted that Figure 2 is the only flowsheet in which a kiln or regenerator for regeneration of at least partially deactivated catalyst is indicated. Those skilled in the art will understand that such a kiln or regenerator is to be included although not illustrated for the other embodiments when the reforming catalyst is of the regeneratable type.

Referring to Figure 2 which is illustrative of a reforming process employing a regeneratable, particle-form solid reforming catalyst such as one of the chromia-alumina type for example, one containing at least 70 mol percent alumina (aluminium oxide) and the balance substantially chromia (chromium oxide). For facility of description the path of the particle-form solid reforming catalyst through the reactor and kiln will be traced and then the paths of the hydrocarbon to be reformed and the effluent will be followed.

Since it is proposed that the reforming reaction be performed at super-atmospheric pressures, it is necessary to provide a catalyst transfer and reactor-sealing means for introducing the catalyst into the reactor and a catalyst-transfer and reactor-sealing means for removing the catalyst from the reactor. Accordingly, a catalyst-transfer and reactor-sealing means comprising gas-tight valves 1 and 2 and intermediate pressuring chamber 3 is provided. The catalyst-transfer and reactor-sealing means operates in a cyclic manner as follows: With gas-tight valve 2 closed and gas-tight valve 1 open, active catalyst flows from hopper 4 into pressuring chamber 3 to fill chamber 3 to a predetermined height. Valve 1 closes and pressuring chamber 3 is purged with an inert and/or non-flammable gas such as flue gas flowing from a source not shown through pipes 5 and 6 under control of valve 7. The purge is vented from chamber 3 through pipes 8 and 9 under control of valve 10 with valve 16 closed. When chamber 3 has been purged, valve 10 closes and with valve 16 closed, pressuring gas such as recycle gas is admitted into chamber 3 through pipes 12 and 6 under control of valve 13 until the pressure in chamber 3 is at least that of reactor 14 and preferably about 5 to about 10 pounds higher. When the desired pressure in chamber 3 is attained, valve 13 closes and gas-tight valve 2 opens. The catalyst in chamber 3 flows into surge chamber 15. When chamber 3 is empty of catalyst, gas-tight valve 2 closes and valve 16 opens permitting the gaseous contents of chamber 3 to escape to the refinery fuel system or to a flare, etc. When the pressure in chamber 3 has been reduced to that of hopper 4, valve 16 closes and chamber 3 is purged as described before, completing a cycle.

The catalyst in surge chamber 15 flows into reactor 14 and downwardly therethrough in contact with the hydrocarbon feed and recycle gas. Contact with the hydrocarbon feed results in the deposition of a carbonaceous deposit, designated "coke" on the catalyst at least partially deactivating the catalyst. Accordingly, the catalyst must be regenerated. The partially deactivated catalyst flows from reactor 14 through catalyst flow-control means 16 which can be of any suitable type such as a throttle valve to surge chamber 17.

Since it is proposed that the kiln or regenerator will operate at pressures lower than that of the reactor in this illustration, it is necessary to provide a catalyst-transfer and reactor-sealing means whereby the particle-form solid reforming catalyst can be removed from the reactor without substantial loss of the vaporous contents thereof. Such a catalyst-transfer and reactor-sealing means can be one similar to that described hereinbefore.

Such a catalyst-transfer and reactor-sealing means comprises gas-tight valves 18 and 19 and intermediate depressuring chamber 20. The catalyst-transfer and reactor-sealing means operates in a cyclic manner as follows: With gas-tight valves 18 and 19 closed, chamber 20 is purged with an inert and/or non-flammable gas such as flue gas flowing from a source not shown through pipes 21 and 22 under control of valve 23. The purge is vented from chamber 20 through pipes 24 and 25 under control of valve 26 with valve 27 closed. When chamber 20 is purged, valves 26 and 23 close and valve 28 opens permitting pressuring gas such as recycle gas to flow through pipes 29 and 22 into chamber 20 until the pressure therein is about that of reactor 14. When the pressure in chamber 20 is about that of reactor 14, valve 28 closes, valve 18 opens and chamber 20 is filled with catalyst from surge chamber 17. Valve 18 closes and valve 27 opens permitting the gaseous content of chamber 20 to escape to a flare or to the refinery fuel gas system, through pipes 24 and 30 under control of valve 27, until the pressure in chamber 20 is about that of kiln 31. When the pressure in chamber 20 is about that of kiln 31, valve 27 closes and chamber 20 is purged with an inert and/or non-flammable gas such as flue gas as described hereinbefore. Gas-tight valve 19 opens and the catalyst is chamber 20 flows into surge chamber 32. When chamber 20 is empty of catalyst gas-tight valve 19 closes completing a cycle.

The partially deactivated catalyst flows from surge chamber 32 to chute 33 and thence to catalyst-transfer means 34 which can be of any suitable type such as a gas-lift, an elevator, etc. The catalyst is transferred by means 34 to chute 35 along which the partially deactivated catalyst flows to kiln feed hopper 36.

From hopper 36 the partially deactivated catalyst flows downwardly into and through kiln 31 which is of any suitable type wherein the coke can be burned off the catalyst in a stream of combustion-supporting gas such as air. The combustion of the coke provides a regenerated catalyst which flows from kiln 31 through conduit 37 to chute 38 and thence to catalyst transfer means 39. The regenerated catalyst is transferred by means 39 to chute 40 along which the reactivated catalyst flows to reactor feed hopper 4 ready to begin another cycle through the reactor and kiln.

Reactor 14 of Figure 2 is piped for total concurrent flow downward, counter-current flow and simultaneous concurrent and counter-current flow of charge mixture and catalyst. The charge mixture comprises a mixture of feed stock, i.e., hydrocarbons or gasoline or naphtha to be reformed, and gaseous heat carrier or hydrogen containing recycle gas. For purposes of discussion, the reforming of a mixture of cracked naphtha and straight-run naphtha will be described.

The hydrocarbon feed comprising straight-run and cracked naphthas is pumped from a source not shown through line 41 to line 42 and to heat exchanger 43 wherein the naphtha feed is in indirect heat exchange relation with total reaction effluent. The naphtha feed flows from heat exchanger 43 through line 44 to coils 45 in naphtha furnace 46. In naphtha furnace 46 the naphtha feed is heated to a reforming temperature of about 850° to about 1080° F., preferably about 960° to about 1060° F. The heated naphtha feed flows from furnace 46 through line 47 to line 48.

Recycle gas having a minimum practical concentration of water, and of $C_4$ and $C_{4+}$ hydrocarbons, designated dry, stripped recycle gas, flows from pipe 49 to pipe 50 thence along pipe 51 to heat exchanger 52. In heat exchanger 52 the dry stripped recycle gas is in indirect heat exchange with the total reactor effluent. The dry, stripped recycle gas flows from heat exchanger 52 through pipe 53 and thence to coil 54 in recycle furnace 55.

In recycle furnace 55 the dry, stripped recycle gas is heated to a temperature in excess of about 1100° F. sufficient that when the recycle gas is mixed with the heated naphtha feed in the ratio of about 1 to 15, preferably about 4 to about 10 mols of recycle gas per mol of naphtha or about 1 to about 8 mols, preferably about 2 to about 5 mols of hydrogen per mol of naphtha feed to form a charge mixture, the charge mixture will have a reforming temperature and will be associated with sufficient heat energy to supply a considerable portion of the required heat of reaction. Usually the dry, stripped recycle gas is heated to about 1200° to about 1300° F. in contrast to the maximum of about 1100° F. when the concentration of water, $C_4$ and $C_{4+}$ hydrocarbons is not reduced to the practical minimum.

The term "reduced to the practical minimum" designates that concentration of water and those concentrations of $C_4$ and $C_{4+}$ hydrocarbons which can be achieved at a cost which is not equal to or does not exceed the value of the gasoline lost because of the presence of a greater amount of water and greater amounts of $C_4$ and $C_{4+}$ hydrocarbons in the recycle gas which has not been dried and stripped. The molecular weight of the naphtha feed is the average molecular weight and is determined in the usual manner from the A.S.T.M. distillation curve.

The heated, dry, stripped recycle gas flows from coils 54 in recycle furnace 55 to pipe 56 and thence under control of valve 57 to line 48 where the heated, dry, stripped recycle gas is mixed with the heated naphtha feed in the ratios enumerated hereinbefore to form a charge mixture. The heated charge mixture flows along line 48 to line 58 and thence to manifold 59.

Manifold 59 is provided with a plurality of branches such as branches 60, 61, 62, 63, 64, 65 and 66 flow through which is controlled respectively by valves 70, 71, 73, 74, 75, 76, 77, 78, and 80. The valve settings for total concurrent flow downward are as follows: Valves 70 and 80 open; valves 71, 73, 74, 75, 76, 77 and 78 closed. The valve settings for total countercurrent flow upward are as follows: Valves 78 and 71 open, valves 70, 73, 74, 75, 76, 77 and 80 closed. For partial countercurrent flow upwardly and the remainder of the flow concurrent downwardly, the valve settings are as follows: Valves 70 and 78 closed and all but one of valves 73, 74, 75, 76, 77 closed with valves 71 and 80 open. The advantages of partial counter-current flow upwardly and the remainder of the flow concurrent downwardly is described in detail in the United States Letters Patents Nos. 2,738,308; 2,742,404; 2,772,216 and 2,763,598, filed May 1, 1952, in the name of Kenneth M. Elliott.

For the purpose of the present discussion, introduction of the charge mixture through manifold branch 63 will be described. Accordingly, the heated charge mixture flows from manifold 59 through branch 63 under control of valve 75 to distributor 81 of any suitable type whereby the charge mixture can be distributed over the cross-section of reactor 14.

Manifold branches 61, 62, 64 and 65 are connected respectively to distributors 83, 82, 85 and 86 of any suitable type whereby the charge mixture can be distributed over the cross-section of reactor 14. Manifold branches 60 and 66 are connected respectively to distributor-collectors 84 and 87 of any suitable type whereby the charge mixture can be distributed over the cross-section of reactor 14 or vaporous contents of the reactor withdrawn over the cross-section of the reactor.

The charge mixture flows from distributor 81 in both an upwardly direction and a downwardly direction dependent upon the setting of throttle valves 71 and 80 as described in the United States Letters Patent No. 2,738,308. The naphtha of the charge mixture flowing upwardly from distributor 81 is reformed and together with the recycle and make gas produced simultaneously enters collector 84 and flows therefrom through branch 60 and line 72 under control of valve 71 to line 88. The naphtha of the charge mixture flowing downwardly from distributor 81 is reformed and together with the recycle gas and make gas produced simultaneously enters collector 87 and flows therefrom through lines 66 and 79 under control of valve 80 to line 89. The reactor effluent in lines 88 and 89 flows to line 90, thence to heat exchanger 52, line 91, heat exchanger 92, line 93, heat exchanger 43, line 94, cooler 95 and line 96 to liquid-gas separator 97.

In liquid-gas separator 97 the constituents of the reactor effluent readily condensed at the temperature and pressure existing therein are separated from the less readily condensed constituents including water, $C_1$, $C_2$, $C_3$, $C_4$ and some $C_{4+}$ hydrocarbons. The non-condensed reactor effluent is drawn from liquid-gas separator 97 through pipe 98 by pump 99 and discharged into pipe 100. The condensed reactor effluent is drawn from liquid-gas separator 97 through line 101 by pump 102 and discharged into line 103. The non-condensed reactor effluent and condensed reactor effluent are mixed in line 103, flow therethrough to cooler 104 and line 105 and thence to liquid-gas separator 106.

In liquid-gas separator 106 the pressure is of the order of about 210 p.s.i. when the reactor pressure is about 185 p.s.i. while the liquid-gas separator temperature is of the order of about 100° F.

In liquid-gas separator 106 the condensed portion of the reactor effluent separates from the uncondensed portion and flows therefrom through line 107 to depropanizer 108. In depropanizer 108 a gaseous $C_3$ cut is taken overhead through pipe 109 to the refinery fuel gas system.

The bottoms in depropanizer 108 flow through line 110 to primary re-run tower 111 from which is taken overhead through line 112 a light gasoline fraction. The bottoms in primary re-run tower 111 flow through line 113 to secondary re-run tower 114.

In secondary re-run 114 a heavy gasoline fraction is taken overhead through line 115 while the bottoms flow through line 116 to polymer storage 117.

In general, the uncondensed reactor effluent flowing from liquid-gas separator 106 will contain about 0.2 to about 2 mol percent water and about 2 to about 20 mol percent of $C_4$ and $C_{4+}$ hydrocarbons. Typical of the concentrations of hydrogen, hydrocarbons and water in such uncondensed reactor effluent flowing from liquid-gas separator 106, is the following analysis:

*Table II*

| | Mols/hr. |
|---|---|
| $H_2$ | 4770.9 |
| $C_1$ | 2457.1 |
| $C_2$ | 1374.4 |
| $C_3$ | 790.5 |
| $C_4$ | 256.0 |
| $C_5$ | 78.9 |
| $C_{6+}$ | 79.5 |
| $H_2O$ | 42.0 |
| Total | 9849.3 |

In accordance with the principles of the present invention the uncondensed portion of the reactor effluent separated in liquid-gas separator 106 flows through pipe 118 to low temperature (low temperature relative to that of separator 106) condenser 119. In condenser 119 the uncondensed reactor effluent from separator 106 is brought into direct heat exchange relation with a heat transfer medium such as water. When the temperature of the heat transfer medium entering condenser 119 is below 32 a suitable antifreeze such as salt or glycol or the like can be added to the heat transfer medium.

Using water as the heat transfer medium, the water is brought into indirect heat exchange relation with a coolant in refrigerator 120. That is to say, a refrigerant such as ammonia or "Freon" for example, under pressure from a refrigerating unit flows from a compressor not shown through pipe 121. From pipe 121 the refrigerant flows to manifold 122 having branches 123 and collector manifold 124. The refrigerant flows from condenser 120 back to the cooler and compressor of the refrigeration unit through pipe 125.

The heat transfer medium, water in this illustration, flows through pipe 126 into refrigerator 120 and in heat exchange relation with manifolds 122 and 124 and branches 123. The water is drawn from refrigerator 120 through pipe 127 by pump 128 and discharged into pipe 129 at the pressure existing in cooler 119. The water flows along pipe 129 to sprayer 130 in cooler 119 at a temperature such that the gaseous effluent therefrom has a water-dew-point not greater than about 60 F. and preferably about 30° F. to about 40° F. or lower. Concommitantly, the concentration of $C_4$ and $C_{4+}$ hydrocarbons is reduced.

The gaseous components of the reactor effluent not condensed in condenser 119 form the dry, stripped recycle gas which flows therefrom at a temperature of about 40° and a pressure of about 210 p.s.i. through pipe 131 to pipe 49. An amount of the dry, stripped recycle gas about equivalent to the net make of gas in reactor 14 is bled off from pipe 49 through pipe 132 under control of valve 133 to the refinery fuel gas system or any suitable use.

The condensate in condenser 119 comprises the heat transfer medium, water, water condensed from the reactor effluent and hydrocarbons condensed from the reactor effluent. The condensate stratifies in the lower portion of condenser 119 into a lower aqueous layer and an upper hydrocarbon layer. The lower aqueous layer flows through pipes 134 and 126 to refrigerator 120 while the upper hydrocarbon layer is drawn off through line 135 under control of valve 136.

Typical of the concentration of hydrocarbons, hydrogen and water of dry, stripped recycle gas flowing from condenser 119 through pipes 131, 49, 50, 51 and 53 to recycle furnace 55 under the conditions set forth hereinbefore, is the following:

*Table III*

| Constituent: | Mols/hr. |
|---|---|
| $H_2$ | 4769.7 |
| $C_1$ | 2454.0 |
| $C_2$ | 1358.7 |
| $C_3$ | 758.5 |
| $C_4$ | 225.3 |
| $C_5$ | 54.5 |
| $C_6$ | 11.3 |
| Water | 6.5 |
| Total | 9638.5 |

Reforming of naphtha in the presence of the aforesaid chromia-alumina type particle-form reforming catalyst takes place under the following conditions:

*Table IV*

| Reactor | Broad | Preferred |
|---|---|---|
| Vapor Inlet Temperature, °F | 850–1,080 | 960–1,060 |
| Catalyst Inlet Temperature, °F | 100–1,100 | 400–1,050 |
| Pressure, p.s.i.a | 15–600 | 100–300 |
| Recycle: | | |
|   Mols Recycle Gas / Mols Naphtha | 1–15 | 4–10 |
|   Mols Hydrogen / Mols Naphtha | 1–8 | 2–5 |
| Space velocity | 0.1–6.0 | 0.5–2.0 |
| Kiln: | | |
|   Temperature, °F | 600–1,400 | 700–1,100 |
|   Pressure, p.s.i.a | 15–600 | 15–35 |

When the economics of dehydrating and stripping the recycle gas of $C_{4+}$ and $C_4$ hydrocarbons are favorable to indirect heat exchange of the recycle gas and a refrigerant rather than the direct of indirect heat exchange of the recycle gas and a heat transfer medium as illustrated in Figure 2, a method such as that illustrated in a highly schematic manner in Figure 3 can be employed. Thus, a reactor 200 is provided with suitable means for introducing active particle-form reforming catalyst thereinto through conduit 201 and with suitable means such as conduit 202 for withdrawing partially deactivated particle-form reforming catalyst. The partially deactivated catalyst is regenerated in any suitable kiln wherein the deactivating coke deposited upon the catalyst during its flow downwardly through reactor 200 can be burned off in a stream of combustion-supporting gas such as air.

Hydrocarbon feed such as straight-run naphtha, cracked naphtha or a mixture of straight-run and cracked naphtha is pumped from a source not shown through line 203 to absorber 204 in which the hydrocarbon feed, hereinafter designated naphtha feed is brought into contact with recycle gas flowing from recycle gas separator 205 through pipe 206 under control of valve 207. The recycle gas, usually about equal in volume to the net gas make in reactor 200 is stripped of $C_4$ and $C_{4+}$ hydrocarbons in its passage upwardly counter-current to the downwardly flowing naphtha feed and flows from absorber 204 through pipe 208 to the refinery fuel gas system or to any suitable means for using the same.

The naphtha feed enriched by the $C_4$ and $C_{4+}$ hydrocarbons stripped from the net make recycle gas flows from absorber 204 through lines 209 and 210 to coil 211 of naphtha heating furnace 212. In naphtha furnace 212 the naphtha is heated to a reforming temperature.

Recycle gas which has been dehydrated and stripped of a substantial portion of $C_4$ and $C_{4+}$ hydrocarbons flows from separator 205 through pipes 213 and 214 to coils 215 in recycle gas heating furnace 216 wherein the dry, stripped recycle gas having a dew-point with respect to water of not more than 60° F. and preferably of not more than 40° F. is heated to a temperature such that when mixed with the heated naphtha feed in the ratio of 1 to about 15, preferably about 4 to about 10 mols of recycle gas or about 1 to about 8, preferably about 2 to about 5 mols of hydrogen per mol of naphtha feed to form a charge mixture, the charge mixture has a reforming temperature of about 850° to about 1080° F., preferably about 960° to about 1060° F.

The heated naphtha feed flows from coils 211 in naphtha furnace 212 through line 217 to line 218 where it is mixed in a ratio set forth hereinbefore with heated dry, stripped recycle gas flowing from coils 215 in recycle furnace 216 through pipe 219 under control of valve 220.

The charge mixture thus formed flows through line 218 to distributor 221 in reactor 200. It will be observed that reactor 200 as illustrated, is provided with only one distributor. However, those skilled in the art will understand that reactor 200 can be piped in the same manner as reactor 14 of Figure 2 for total concurrent total counter-current or various distributions of the charge mixture for partial concurrent and partial countercurrent flow of the charge mixture.

Dependent upon the settings of throttling valves 222 and 223 a portion of the charge mixture will flow upwardly from distributor 221 to collector 224 and the balance will flow downwardly from distributor 221 to collector 225.

The effluent from the upper portion of the bed of particle-form reforming catalyst flows from collector 224 to line 226 under the control of throttling valve 222. The effluent from the lower portion of the bed of particle-form reforming catalyst flows from collector 225 to line 227 under the control of throttling valve 223 and thence to line 226 where the effluents from the upper and lower portions of the reactor mix.

The mixed effluent from reactor 200 flows along line 226 to heat exchange equipment designated 228 and thence along line 229 to polymer tower 230. In polymer tower 230 the heavy ends of the effluent separate and are withdrawn through line 231 while a portion of the effluent boiling in the gasoline range is circulated by pump 232 through lines 233 and 234 as a tower reflux.

The light, i.e. lower boiling, portion of the effluent together with the gaseous portion thereof flows from polymer tower 230 through line 235 to cooler 236 and thence through line 237 to line 238.

The low boiling effluent, i.e. boiling below the boiling point of the polymer separated in polymer tower 230, flows through line 238 to primary liquid gas separator 240.

In primary liquid-gas separator 240 that portion of the effluent which readily condenses under the existing conditions of temperature and pressure separates from the less readily condensed portion and is drawn therefrom through line 241 by pump 242. The less readily condensed portion of the effluent is drawn from primary separator 240 through pipe 243 by pump 244.

The readily condensed portion of the effluent is discharged by pump 242 into line 245. The less readily condensed portion of the effluent is discharged by pump 244 into pipe 246 along which it flows to line 245. The discharge of pump 244 is mixed with the discharge of pump 242 in line 245. The mixture flows thence to cooler 247. From cooler 247 the mixture flows to recycle gas separator 205 through line 248.

Liquid-gas separator 205, as illustrated, comprises a two-compartment tank. The effluent mixture flows from line 248 into the lower compartment L. In compartment L the readily condensed portion of the effluent mixture separates from the uncondensed portion and is withdrawn therefrom through line 249. The uncondensed portion of the effluent mixture flows from compartment L through pipe 250.

A portion of the uncondensed effluent usually about equivalent to the net make of gas in reactor 200 is bled off through pipe 206 under control of valve 207 to absorber 204 where it is stripped of substantially all of the $C_4$ and $C_{4+}$ hydrocarbons as described hereinbefore. The balance of the uncondensed effluent, i.e., wet recycle gas, flows along pipe 250 to cooler 251 where it is brought into indirect heat exchange relation with refrigerant. The refrigerant is supplied by compressor 253 by way of conduit 258, condenser 256 and conduit 257. In condenser 256 the refrigerant is cooled by coolant such as water flowing from a source not shown through pipe 258 to condenser 256 and thence to waste or cooling and recycle through pipe 259. The refrigerant after use in cooler 251 flows back to compressor 253 through conduit 252. Compressor 253 is driven by motor 255 through belt 254.

The recycle gas cooled to a dew-point of at least 60° F. and preferably to a dew-point of about 30° to about 40° F. with respect to water flows from cooler 251 through line 260 to compartment U of recycle gas separator 205.

In recycle gas separator 205 compartment U, the condensate formed in cooling the recycle gas to a dew-point of at least 60° F. separates and flows through pipe 239 to the product recovery system not shown.

The dry, stripped recycle gas flows from compartment U through pipe 213 and thence to recycle gas furnace 216.

Those skilled in the art will understand that two containers can be used in place of the two compartment container 205.

The water separated in the lower section of recycle gas separator 205 is drained to waste as required through line 261.

Illustrative of the composition of the wet recycle gas flowing to refrigeration through line 250 when compartment L of recycle gas separator 205 is at a temperature of about 100° F. and a pressure of about 240 p.s.i. is the following:

Table V

| | Mols/hr. |
|---|---|
| Hydrogen | 713.1 |
| $C_1$ | 413.8 |
| $C_2$ | 283.8 |
| $C_3$ | 145.5 |
| $C_4$ | 57.8 |
| $C_5$ | 14.0 |
| $C_{6+}$ | 12.0 |
| $H_2O$ | 6.5 |
| Total | 1646.5 |

The dry, stripped recycle gas produced therefrom at 40° F. has the following composition:

Table VI

| | Mols/hr. |
|---|---|
| Hydrogen | 712.9 |
| $C_1$ | 413.2 |
| $C_2$ | 280.4 |
| $C_3$ | 139.7 |
| $C_4$ | 50.0 |
| $C_5$ | 9.2 |
| $C_{6+}$ | 1.6 |
| $H_2O$ | 0.8 |
| Total | 1607.8 |

In the highly schematic flow-sheet presented as Figure 4 another method of increasing the yield of gasoline by removing water and $C_4$ and $C_{4+}$ hydrocarbons is illustrated. Reactor 300 is provided with a conduit 301 for introducing active particle-form reforming catalyst and conduit 302 for removing reforming catalyst partially deactivated in its passage downwardly through reactor 300 by contact with the charge stock. The partially deactivated reforming catalyst withdrawn from reactor 300 is transferred in any suitable manner to a kiln or regenerator in which the deactivating carbonaceous deposit can be burned off in a stream of combustion-supporting gas such as air. A kiln such as that represented in Figure 2 can be used for this purpose.

While reactor 300 is provided with only one means of introducing the charge mixture thereinto, those skilled in the art will understand that reactor 300 can be provided with charge mixture inlets so that the flow of charge mixture can be totally upward or totally downward or partially upward and partially downward through portions of the catalyst bed having different depths than that represented. In other words, reactor 300 can be provided with a plurality of charge mixture inlets such as reactor 14 in Figure 2.

Hydrocarbon feed such as straight-run naphtha or cracked naphtha or a mixture of straight-run and cracked naphtha is pumped from a source not shown through line 303 to coils 304 in naphtha heating furnace 305. In naphtha furnace 305 the charge naphtha is heated to a reforming temperature of about 850° to about 1080° F. preferably about 960° to about 1060° F.

Dry stripped recycle gas is drawn from liquid-gas separator 306 through pipe 307 by pump 308 and discharged through pipe 309 into lines 310 and 314. A portion of the dry, stripped gas about equivalent to the net gas make in reactor 300 is discharged through pipe 314 under control of valve 315. The balance flows through pipe 310 to pipe 311 and thence to coils 312 in recycle gas heating furnace 313. In recycle gas furnace 313 the dry, stripped recycle gas is heated to a temperature in excess of 1100° F., usually about 1200° to about 1300° F.

The feed naphtha heated in naphtha furnace 305 flows therefrom through line 316. The heated, dry, stripped recycle gas flows from recycle gas furnace 313 through pipe 317 under control of valve 318. The heated recycle gas is mixed in line 316 with the heated naphtha in a ratio of about 1 to about 15, preferably about 4 to about 10 mols of recycle gas per mol of naphtha or about 1 to about 8, preferably about 2 to about 5 mols of hydrogen per mol of naphtha to form a charge mixture.

The charge mixture flows along line 316 to distributor 319 in reactor 300 into which the charge mixture is discharged at a temperature of about 850° to about 1080° F., preferably about 960° to about 1060° F.

In accordance with the setting of throttle valves 320 and 321, a portion of the charge mixture flows upward from distributor 319 counter-current to the downwardly flowing particle-form reforming catalyst while the balance flows downward from distributor 319.

The effluent from the upper reaction zone flows from reactor 300 through line 322 under control of valve 321 while the effluent from the lower reaction zone flows through line 323 under control of valve 320. The effluent from the upper reaction zone flows along line 322 and the effluent from the lower reaction zone flows along line 323 to line 324 in which the effluents from both reaction zones are mixed.

The mixed effluent flows along line 324 to heat exchange equipment and a primary cooler for removing water designated as 325. Thence the cooled effluent flows along line 326 to refrigerating unit 327.

In refrigerating unit 327 the cooled effluent is brought into indirect heat exchange either with a refrigerant such as ammonia or "Freon" or with a heat transfer medium such as water entering the unit through pipe 328, flowing through coil or grid 329 leaving the unit through pipe 330 to be cooled and recycled.

In refrigerating unit 327 the dew-point of the effluent is lowered to at least 60° F. and when desirable or necessary to about 25° to about 40° F. The refrigerated effluent flows from refrigerating unit 327 through line 331 to liquid-gas separator 306.

In liquid-gas separator 306 the condensed portion of the refrigerated effluent separates from the uncondensed portion of the effluent and forms two liquid layers in the lower part of the separator. The upper layer of reformate flows from separator 306 through line 332 under control of valve 333 to a stabilizer, fractionating and other finishing means.

The water which forms the lower layer of the condensate in separator 306 is drawn off through line 334 under control of valve 335. Alternatively, a part of the aqueous condensate can be drawn from separator 306 through lines 334 and 336 by pump 337 and discharged into line 338 along which the aqueous condensate flows to line 326 to be mixed with the cooled effluent before entering refrigerating unit 327. When the temperatures existing in refrigerating unit 327 and separator 306 are such that water condensed from the effluent will freeze, an anti-freeze such as brine, glycol, alcohol, etc., is introduced into the aqueous condensate in line 336 through pipe 339 under control of valve 340.

The uncondensed portion of the effluent in separator 306 is drawn therefrom through pipe 307 by pump 308 and discharged into pipe 309. The uncondensed effluent discharged into pipe 309 is dry, stripped gas comprising recycle gas and the net gas make of reactor 300. The gas discharged into pipe 309 has a dew-point not greater than about 50°–60° F. and on occasion a dew-point of about 25° to about 40° F. with respect to water and is designated dry because of its low moisture content relative to the moisture content when not "refrigerated." The gas discharged into pipe 309 had a reduced content of $C_4$ and $C_{4+}$ hydrocarbons relative to the $C_4$ and $C_{4+}$ hydrocarbon content when not "refrigerated."

The gas discharged into pipe 309 flows to pipes 310 and 314. The major portion flowing through pipe 310 for use as recycle gas as described hereinbefore and the balance, the net make of gas in reactor 300, flowing to the refinery fuel gas system or other use.

While methods for increasing the yield of gasoline by removing water and $C_4$ and $C_{4+}$ hydrocarbons illustrated in Figures 3 and 4 have involved subjecting the total effluent to "refrigeration," in some refineries, it will be advantageous to subject only that portion of the reactor effluent which is not condensed at the temperature produced by the primary cooler. Such a method is illustrated in Figure 5. The recycle gas so obtained contains the same amount of water and, under some conditions, somewhat more $C_4$ and $C_{4+}$ hydrocarbons.

In Figure 5 reactor 350 is provided with conduit 351 for introducing active reforming catalyst thereinto and conduit 352 for withdrawing partially deactivated reforming catalyst therefrom. The active catalyst flows downward through reactor 350 in contact with the charge mixture and becomes partially deactivated by the deposition of a carbonaceous material designated as coke. The partially deactivated reforming catalyst is withdrawn from reactor 350 through conduit 352 and transferred to a kiln or regenerator in any suitable manner. In the kiln or regenerator the coke is burned off in a stream of combustion-supporting gas such as air.

Hydrocarbon feed such as naphtha is pumped from a source not shown through line 353 to coils 354 in naphtha furnace 355. In naphtha heating furnace 355 the hydrocarbon feed is heated to a reforming temperature of about 850° to about 1080° F., preferably about 960° to about 1060° F.

Gaseous heat carrier such as recycle gas containing at least about 25 percent hydrogen having a dew-point not greater than about 60° F. and a reduced content of $C_4$ and $C_{4+}$ hydrocarbons relative to recycle gas which has not been "refrigerated" flows from liquid-gas separator 356 through pipes 357 and 358 to coils 359 in recycle gas heating furnace 360. The recycle gas is heated to about 1200° to about 1300° F. in recycle gas furnace 360. The heated recycle gas flows from furnace 360 through pipe 361 under control of valve 362.

The heated naphtha flows from naphtha furnace 355 through line 363 to line 364. The heated recycle gas flows from pipe 361 under control of valve 362 and is mixed with the heated naphtha in line 364 in the ratio of about 1 to about 15, preferably about 4 to about 10 mols of recycle gas or about 1 to about 8 preferably about 2 to about 5 mols of hydrogen per mol of naphtha. (The average molecular weight of the naphtha being determined in the usual manner from the A.S.T.M. distillation curve.) The charge mixture comprising heated naphtha and heated recycle gas flows along line 364 to distributor 365 of any suitable design whereby the charge mixture is distributed over the cross-section of reactor 350. The charge mixture flows downward concurrent with the downwardly flowing column of particle-form reforming catalyst. The reaction products, recycle gas and make gas leave reactor 350 through collector 366, line 367 and line 368. From line 368 the reactor effluent flows to heat exchange equipment designated as 369 and thence through line 370 to primary liquid-gas separator 371.

In primary liquid-gas separator 371 the readily condensed portion of the reactor effluent including some water separates from the less readily condensed portion of the reactor effluent and forms two layers in the lower portion of separator 371. The lower aqueous layer is withdrawn through line 372 under control of valve 373 while the upper reformate layer is withdrawn through line 374 under control of valve 375 to be stabilized, fractionated or otherwise finished.

The less readily condensed vaporous portion of the reactor effluent containing water, $C_4$ and $C_{4+}$ hydrocarbons is drawn from separator 371 through pipe 376 by pump 377 and discharged into pipe 378. The vaporous portion of the reactor effluent flows along pipe 378 to cooler 379 and thence along pipe 380 to "refrigerating" unit 381.

In "refrigerating" unit 381 the vaporous portion of the reactor effluent is brought into indirect heat exchange relation either with a refrigerant such as ammonia or a heat transfer medium such as water flowing into "refrigerating" unit 381 through pipe 383, thence through coil 382 and out of the unit through pipe 384 to a cooler and recycle through the "refrigerating" unit.

The vaporous portion of the reactor effluent contacts coil 382 and thereby the temperature of the vapors is lowered to a point such that the dew-point of the vapors with respect to water is not greater than about 60° F. The "refrigerated" vapors flow from refrigerating unit 381 through pipe 385 to liquid-gas separator 356.

In liquid-gas separator 356 the condensate formed as a result of the "refrigerating" of the vapors separates as a two layer liquid. The lower layer being aqueous and the upper layer composed of $C_4$ and $C_{4+}$ hydrocarbons. The aqueous layer is withdrawn from separator 356 through pipe 386 under control of valve 387. The hydrocarbon layer is withdrawn from separator 356 through line 388 under control of valve 389. The hydrocarbons flow along line 388 to line 375 to mix with the condensed reformate from separator 371.

In Figure 6 is illustrated in a highly schematic manner another method of increasing the yield of gasoline by removing water and $C_4$ and $C_{4+}$ hydrocarbons from the recycle gas. This method involves mixing "refrigerated" bottoms from the depropanizer and/or the primary rerun tower with the "refrigerated" vaporous uncondensed portion of the reactor effluent.

As illustrated, reactor 400 is piped for split-flow feed of the charge mixture to the reactor. Reactor 400 is provided with conduit 401 for introduction of active particle-form reforming catalyst into reactor 400 and with conduit 402 for withdrawal of deactivated catalyst.

Hydrocarbon feed such as straight-run, cracked or a mixture of straight-run and cracked naphtha is pumped from a source not shown through line 403 to coil 404 in naphtha heating furnace 405. In naphtha furnace 405 the hydrocarbon feed is heated to reforming temperatures and flows therefrom through line 406.

Dry, stripped recycle gas, i.e., recycle gas having a dew-point not greater than 60° F. flowing from liquid-gas separator 407 through pipes 408 and 409 is heated in coils 410 in recycle gas heating furnace 411 to a temperature of at least about 1200° F. The heated, dry, stripped recycle gas flows from recycle gas furnace 411 through pipe 412 under control of valve 413 to line 414.

Heated hydrocarbon feed flows from furnace 405 along line 406 to line 414 where it is mixed with heated recycle gas to form a charge mixture. The charge mixture flows along line 414 to distributor 415 in reactor 400. Distributor 415 is of any suitable design which provides distribution of the charge mixture over the cross-section of reactor 400.

A portion of the charge mixture dependent upon the setting of throttle valve 416 flows upward in reactor 400 to collector 417 and thence through line 418 under control of valve 416 to line 419. The balance of the charge mixture flows downward through reactor 400 to collector 420 and thence through line 421 under control of valve 422 to line 419. (Details of a means for splitting the charge mixture between an upper and a lower bed of catalyst are given in United States Letters Patent No. 2,738,308; filed May 1, 1952, in the name of Kenneth M. Elliott.)

The effluents from both zones mix in line 419 and flow to heat exchange equipment designated 420. From heat exchange equipment 420 the reactor effluent flows along line 421 to primary liquid-gas separator 422. In primary separator 422 the more readily condensed portion of the reactor effluent including some water separates as two layers in the lower portion of separator 422. The lower aqueous layer is withdrawn through pipe 423 under control of valve 424 while the upper layer comprising condensed reformate is withdrawn through line 425 under control of valve 426. The condensed reformate flows along line 425 to depropanizer 427.

The less readily, vaporous portion of the reactor effluent is drawn from separator 422 through pipe 428 by pump 429 and discharged into pipe 430. The vaporous portion of the effluent flows along line 430 to cooler 431 and thence to pipe 432. From pipe 432 the cooled vaporous portion of the reactor effluent enters "refrigerating" unit 433 wherein the cooled vaporous portion of the reactor effluent is brought into indirect heat exchange relation with a refrigerant such as ammonia, "Freon," etc., or a heat transfer medium such as water or water containing an anti-freeze. The coolant flows from a source not shown through pipe 434 thence through coil or grid 435 and out of the unit through pipe 436 to a cooler not shown to be recycled through the unit.

In "refrigerating" unit 433 the vaporous portion of the reactor effluent is in contact with coil or grid 435 and is cooled to a dew-point not greater than 60° F. The "refrigerated" vaporous portion of the reactor effluent flows from "refrigerating" unit 433 through line 437 to liquid-gas separator 407.

In line 437 the "refrigerated" vaporous portion of the reactor effluent is mixed with "refrigerated" bottoms from the depropanizer and/or primary re-run tower flowing from "refrigerating" unit 438 through line 439. "Refrigerated" bottoms is added in the ratio of about 0.05 to about .5 moles per mole of refrigerated reactor effluent. The mixture of "refrigerated" vaporous portions of the reactor effluent and refrigerated bottoms of the depropanizer and/or primary re-run tower separates into a lower two layer liquid and into a vaporous phase. The lower two layer liquid comprises an aqueous layer and an upper hydrocarbon layer comprising the aforesaid bottoms and $C_4$ and $C_{4+}$ hydrocarbons separated from the "refrigerated" vaporous portion of the reactor effluent.

The aqueous layer is withdrawn from separator 407 through line 440 under control of valve 441. The liquid hydrocarbon layer is withdrawn from separator 407 through line 442 under control of valve 443. The withdrawn hydrocarbon layer flows along line 442 to line 425 and thence to depropanizer 427.

The "refrigerated" vaporous portion of the reactor effluent flows from separator 407 through pipe 408 to pipe 409 from which a portion about equivalent to the net make of gas in reactor 400 is bled-off through pipe 444 under control of valve 445. The balance, dry, stripped recycle gas flows along line 409 to coil 410 in furnace 411.

The condensed reformate from separator 422 and the condensed reformate from separator 407 flow through line 425 to depropanizer 427. A $C_3$ cut is taken overhead through line 446 from depropanizer 427 to pipe 444.

The bottoms from depropanizer 427 in whole or in part flow along line 447 to primary re-run tower 448. When a portion of the depropanizer bottoms is to be used in stripping the vaporous portion of the reactor effluent, valve 450 is opened and the selected portion of the depropanizer bottoms flows through line 449 to line 451.

The whole or part of the depropanizer bottoms not drawn off through line 449 flows through line 447 to primary re-run tower 448. In primary re-run tower 448 a light gasoline cut is taken overhead through line 452 to storage while the bottoms flow from primary re-run tower 448 through line 453 and thence to secondary re-run tower 456. When desired or necessary, a portion of the bottoms from the primary re-run tower is drawn off through line 454 under control of valve 455 to line 451.

The portion of the depropanizer bottoms and/or the portion of the primary re-run tower bottoms in line 451 is drawn therefrom by pump 457 and discharged into line 458 along which it flows to coil 459 in "refrigerating" unit 438. Coolant flows from a source not shown through pipe 460 to coil or grid 459 and thence to pipe 461 to a cooler and to recycle through the unit.

The discharge of pump 457 flows along line 458 into "refrigerating" unit 438 where it is in indirect heat exchange relation with the coolant in coil 459. The bottoms is cooled to about 60° to about —20° F. in unit 459 and flows along line 439 to line 437 where it is mixed with the "refrigerated" vaporous portion of the reactor effluent.

In secondary re-run tower 456 a heavy gasoline cut is taken overhead through line 462 while the bottoms are withdrawn through line 463.

In Figure 7 a method of increasing the yield of reformed gasoline by removing water, $C_4$ and $C_{4+}$ hydrocarbons is illustrated in a highly schematic manner in which the "refrigerated" vaporous portion of the reactor effluent is contacted with refrigerated hydrocarbon feed. Thus, reactor 475 is provided with conduit 476 for introducing active catalyst and conduit 477 for removing deactivated catalyst.

Hydrocarbon feed such as straight-run or cracked naphtha is pumped from a source not shown through line 478 to "refrigerating" unit 479. Coolant flows from a source not shown through pipe 480 to coil or grid 481 and thence through pipe 482 to a cooler and recycle to the unit. In "refrigerating" unit 479 the hydrocarbon feed is in indirect heat exchange relation with a refrigerant such as ammonia or "Freon" or the like or a heat transfer medium such as water. In the refrigerating unit the temperature of the hydrocarbon feed is lowered to about 60° to about —20° F. The "refrigerated" feed flows from "refrigerating" unit 479 through line 483 to absorber 484.

In absorber 484 the "refrigerated" feed flows downward counter-current to the upwardly flowing "refrigerated" vaporous portion of the reactor effluent flowing from "refrigerating" unit 485 through pipe 486. The hydrocarbon feed enriched by the $C_4$ and $C_{4+}$ hydrocarbons stripped from the "refrigerated" vaporous portion of the reactor effluent flows from absorber 484 through line 487.

The stripped "refrigerated" vaporous portion of the reactor effluent flows from absorber 484 through pipe 488 and is at this point designated dry, stripped recycle gas. A portion of the dry, stripped recycle gas about equivalent to the net make of gas in reactor 475 is bled-off through pipe 489 under control of valve 490. The balance flows through pipe 491 to coils 492 in furnace 493. In furnace 493 the dry, stripped recycle gas is heated to at least 1200° F.

The enriched hydrocarbon feed flows from absorber 484 through line 487 either directly through line 497 under control of valve 498 to coils 495 in naphtha furnace 496 or through line 499 under control of valve 500 to flash tower 501. When desirable, a portion of the enriched hydrocarbon feed can flow directly to the naphtha furnace and the balance to the flash tower. The bottoms of the flash tower 501 flows therefrom through line 502 to line 497 and thence to coils 495 in naphtha furnace 496. The overhead from flash tower 501 flows through pipe 503 to line 504 where it is mixed with the hydrocarbon condensate separated in liquid-gas separator 505.

The hydrocarbon feed is heated in coils 495 in naphtha furnace 496 to reforming temperatures dependent upon the catalyst employed and the severity required and with a chromia-alumina catalyst to a temperature of about 850° to about 1080° F. The heated hydrocarbon feed flows from coils 495 through line 506 to line 507. The heated, dry, stripped recycle gas flows from coils 492 through pipe 494 under control of valve 508 to line 507 where it is mixed with the heated hydrocarbon feed to form a charge mixture. The heated charge mixture flows from line 507 to line 509 and thence to distributor 510.

The charge mixture flows upward through reactor 475 in contact with the particle-form reforming catalyst. The reaction products, recycle gas and make gas leave reactor 475 through collector 511 and line 512. The reactor effluent flows through line 512 to heat exchange equipment designated 513 and thence through line 514 to liquid-gas separator 505.

In liquid-gas separator the condensate forms two layers an upper layer comprising condensed reformate and a lower aqueous layer. The upper layer of condensed reformate flows from liquid-gas separator 505 through line 504 under control of valve 515 to stabilizer 516 where together with the overhead from flash tower 501 it is fractionated to yield an overhead comprising dry gas taken through pipe 517 and a reformate bottoms which flows through line 518 to further fractionation and finishing.

The aqueous layer of condensate separated in liquid-gas separator is withdrawn therefrom through pipe 519 under control of valve 520.

The uncondensed portion of the reactor effluent flows from liquid-gas separator 505 and is drawn therefrom through pipe 521 by pump 522 and discharged into pipe 523. From pipe 523 the uncondensed effluent flows to cooler 524 and thence through pipe 525 to "refrigerating" unit 485.

In "refrigerating" unit 485 the uncondensed effluent is in indirect heat exchange relation with a coolant flowing from a source not shown through pipe 526 to coil or grid 527 and thence through pipe 528 to a cooler and recycle to the "refrigerating" unit.

By indirect heat exchange with the coolant in coil or grid 527 the temperature of the uncondensed effluent is lowered so that the dew-point thereof is not greater than about 60° F. The "refrigerated" uncondensed effluent flows from "refrigerating" unit 485 through pipe 486 to absorber 484 as described hereinbefore.

Figure 8 is a highly schematic flow-sheet of recovery portion of a flow-sheet illustrating another method of increasing the yield of gasoline by removing water, $C_4$ and $C_{4+}$ hydrocarbons from the recycle gas. Reactor effluent flows from heat exchange equipment not shown through line 550 to cooler 551 and thence through line 552 to liquid-gas separator 553.

In liquid-gas separator 553 the condensed portion of the reactor effluent settles to the lower portion of the separator and is drawn therefrom through line 554. The uncondensed portion of the reactor effluent is drawn from separator 553 through pipe 555 by pump 556. Pump 556 discharges into pipe 557 along which the uncondensed effluent flows to cooler 558 and thence through pipe 559 to line 560. In line 560 the cooled uncondensed effluent is mixed with "refrigerated" bottoms from self-cooling flash-drum 561 flowing thereto through line 562.

The mixture of cooled uncondensed reactor effluent and "refrigerated" bottoms from flash-drum 561 flows through line 560 to liquid-gas separator 563. In separator 563 the condensed hydrocarbons and water separate as a two layer liquid in the bottom. The lower, aqueous layer withdrawn from separator 563 through line 564 under control of valve 565. The hydrocarbon condensate comprising the "refrigerated" bottoms of flash-drum 561 and the hydrocarbon condensate from the uncondensed reactor effluent flow from separator 563 through line 566 under control of valve 567 to self-cooling flash-drum 561.

In self-cooling flash-drum 561 a dry gas is obtained as an overhead in the usual manner by reducing the pressure. Concomitantly, the temperature in flash-drum 561 is lowered. The dry gas is taken overhead from flash-drum 561 through pipe 568.

The bottoms of flash-drum 561 is withdrawn through line 569 and mixed in line 570 with reformate separated in liquid-gas separator 553 and withdrawn therefrom through line 554.

A portion or all of the bottoms of flash-drum 561 is drawn through line 571 under control of valve 572 by pump 573 and discharged by pump 573 into line 574.

The bottoms flow along line 574 to "refrigerating" unit 575. In "refrigerating" unit 575 the bottoms is in indirect heat exchange relation with a coolant flowing from a source not shown through pipe 576, grid or coil 577 and thence through pipe 578 to a cooler not shown and recycle to the "refrigerating" unit.

In "refrigerating" unit 575 the temperature of the flash drum bottoms is lowered to about 40° to about −50° F. and sufficient when mixed with the uncondensed effluent in line 560 to produce a dew-point not greater than about 60° F. The "refrigerated" bottoms flow from "refrigerating" unit 575 through line 562 to line 560 where the "refrigerated" bottoms is mixed with the cooled uncondensed reactor effluent as described hereinbefore. When necessary to eliminate the formation of ice, an anti-freeze such as brine can be mixed with the flash-drum bottoms. Thus, brine is pumped through line 579 to line 574 and mixed therein with the flash-drum bottoms.

In liquid-gas separator 563 the gaseous portion of the reactor effluent having a dew-point not greater than about 60° F. flows therefrom through pipe 580 to pipe 581 for use as dry, stripped recycle gas. A portion of the dry, stripped recycle gas about equivalent to the net gas make in the reforming reactor is bled off from pipe 581 through pipe 582 under control of valve 583 to the refinery fuel gas system or other use.

It will be understood by those skilled in the art that the foregoing description is that of a method of reforming hydrocarbons in which a mixture of hydrocarbons containing hydrocarbons capable of being reformed together with a gaseous heat carrier or gas containing at least 25 percent hydrogen is contacted with a particle-form reforming catalyst under reforming conditions of temperature and pressure to produce a reactor effluent containing hydrocarbons and water, cooling at least the vaporous portion of said reactor effluent to a temperature such that said cooled vaporous portion has a dew-point not greater than about 60° F., separating the condensate so formed from vapors having a dew-point not greater than about 60° F., heating at least a portion of said separated vapors to at least a reforming temperature and introducing said heated vapors into said reactor. It will also be understood by those skilled in the art that the entire reactor effluent can be cooled to a temperature such that the vaporous portion thereof has a dew-point in excess of 60° F. and the entire cooled effluent or the vaporous portion only subsequently cooled to a temperature such that upon separation of the condensate so formed the vaporous portion has a dew-point not greater than about 60° F. Those skilled in the art will likewise understand that before or after cooling to a temperature such that the vaporous portion of the effluent has a dew-point not greater than 60° F. the vaporous effluent can be contacted with an absorbent for $C_4$ and $C_{4+}$ hydrocarbons particularly at temperatures below ambient temperatures.

We claim:

1. In the method of reforming hydrocarbons wherein a mixture of hydrocarbons and gaseous heat carrier is contacted in a reformer with particle-form solid reforming catalyst under reforming conditions of temperature and pressure, wherein a vaporous reformer effluent comprising water and $C_1$ and heavier hydrocarbons is obtained, wherein said reformer effluent is cooled to a temperature at which the major portion of the $C_4$ and heavier hydrocarbons thereof are condensed to form a liquid phase comprising $C_4$ and heavier hydrocarbons and a vapor phase comprising water and $C_1$ and heavier hydrocarbons, and wherein said vapor phase is heated to at least a reforming temperature and recycled to said reformer, the improvement which comprises cooling at least the vapor phase of said reformer effluent to condense $C_4$ and heavier hydrocarbons and to provide a vapor phase for heating and recycling to said reformer containing not more than about 4 mol percent of $C_4$, $C_5$ and $C_6$ hydrocarbons and having a dew point not higher than about +60° F.

2. The improvement in the method of reforming hydrocarbons as set forth and described in claim 1 wherein the vapor phase before heating has a dew point within the range of about +40° and about +60° F. and the vapor phase is heated to a temperature of at least about 1200° F.

3. In the method of reforming hydrocarbons wherein a mixture of hydrocarbons and gaseous heat carrier is contacted in a reformer with particle-form solid reforming catalyst under reforming conditions of temperature and pressure, wherein a vaporous reformer effluent comprising water, and $C_1$ and heavier hydrocarbons is obtained, wherein said reformer effluent is cooled to a temperature at which the major portion of the $C_4$ and heavier hydrocarbons thereof are condensed to form a liquid phase, wherein said liquid phase is separated from a vapor phase comprising water and $C_1$ to $C_4$ and heavier hydrocarbons, and wherein said vapor phase, designated recycle gas, is heated at least to reforming temperatures and recycled to said reformer, the improvement which comprises cooling said recycle gas to a temperature at which a portion of said $C_4$ and heavier hydrocarbons are condensed to provide a second liquid condensate and a dry recycle gas having a dew point within the range of about +40° to about +60° F. and containing not more than about 4 mol percent $C_4$, $C_5$ and $C_6$ hydrocarbons, heating said dry recycle gas at least to reforming temperature, and recycling said dry recycle gas to said reformer.

4. The improvement in the method of reforming hydrocarbons as set forth and described in claim 3 wherein the dry recycle gas comprises at least 25 percent hydrogen and the dry recycle gas is heated to at least 1200° F.

5. In the method of reforming hydrocarbons wherein a mixture of hydrocarbons and hydrogen-containing recycle gas is contacted in a reformer with particle-form solid reforming catalyst under reforming conditions of temperature and pressure wherein a reformer effluent comprising hydrogen, water and $C_1$ and heavier hydrocarbons is obtained, wherein said reformer effluent is cooled to a temperature at which a major portion of $C_4$ and heavier hydrocarbons thereof are condensed to form a liquid phase and provide a vapor phase comprising hydrogen, water, and $C_1$ and heavier hydrocarbons, wherein said liquid phase is separated from said vapor phase, wherein said vapor phase containing more than 4 mol percent $C_4$, $C_5$ and $C_6$ hydrocarbons is heated to reforming temperature, and wherein the heated vapor phase is recycled to said reformer, the improvement which comprises prior to heating said vapor phase to reforming temperature bringing said vapor phase in indirect heat relation with a coolant to cool said vapor phase to condense a portion of said $C_4$ and heavier hydrocarbons to provide a second condensate and a second vapor phase containing not more than about 4 mol percent $C_4$, $C_5$ and $C_6$ hydrocarbons and having a dew point with respect to water within the range of about +40° and about +60° F., separating said second vapor phase from said second condensate, heating said second vapor phase having a dew point with respect to water within the range of about +40° to about +60° F. and containing not more than about 4 mol percent of $C_4$, $C_5$ and $C_6$ hydrocarbons to reforming temperature, and recycling said heated second vapor phase to said reformer.

6. The improvement in the method of reforming hydrocarbons as set forth and described in claim 5 wherein the second vapor phase contains at least 25 percent hydrogen and is heated to at least about 1200° F.

7. In the method of reforming hydrocarbons wherein a mixture of hydrocarbons and hydrogen-containing gas is contacted in a reformer with particle-form solid reforming catalyst under reforming conditions of temperature and pressure, wherein a reformer effluent comprising water, hydrogen, and $C_1$ and heavier hydrocarbons is produced, wherein said reformer effluent is cooled to produce a vapor phase, designated recycle gas comprising water, hydrogen, and $C_1$ and heavier hydrocarbons containing in excess of 4 mol percent $C_4$, $C_5$ and $C_6$ hydrocarbons, and to produce a liquid phase comprising a major portion of the $C_4$ and heavier hydrocarbons in said reformer effluent, wherein said recycle gas is separated from said liquid phase, wherein said recycle gas is heated at least to a reforming temperature, and wherein said heated recycle gas is recycled to said reformer, the improvement which comprises cooling said recycle gas prior to heating to reforming temperature by direct heat exchange with a coolant to condense at least a portion of the $C_4$, $C_5$ and $C_6$ hydrocarbons and to condense at least a portion of said water in said recycle gas to form a condensate and to provide dry recycle gas, separating said dry recycle gas containing not more than about 4 mol percent $C_4$, $C_5$ and $C_6$ hydrocarbons and having a dew point with respect to water not higher than about $+60°$ F. from said condensate, heating said dry recycle gas to reforming temperature, and recycling said heated dry recycle gas to said reformer.

8. The improvement in the method of reforming hydrocarbons as set forth and described in claim 7 wherein the dry recycle gas contains at least 25 percent hydrogen and is heated to at least 1200° F.

9. In the method of reforming hydrocarbons wherein a mixture of hydrocarbons and hydrogen-containing gas is contacted in a reformer with particle-form solid reforming catalyst under reforming conditions of temperature and pressure, wherein a reformer effluent comprising water, hydrogen, and $C_1$ and heavier hydrocarbons is obtained, wherein said reformer effluent is cooled to a temperature at which a major portion of the $C_4$ and heavier hydrocarbons are condensed to provide a liquid phase and a vapor phase, wherein said liquid phase is separated from said vapor phase to provide a recycle gas comprising water, hydrogen and a minor proportion of said $C_4$ and heavier hydrocarbons in excess of about 4 mol percent, wherein said recycle gas is heated at least to a reforming temperature, and wherein said heated recycle gas is recycled to said reformer, the improvement which comprises cooling substantially the total reformer effluent in a heat exchanger to a temperature at which a vapor phase having a dew point with respect to water not higher than $+60°$ F. and containing not more than about 4 mol percent of $C_4$, $C_5$ and $C_6$ hydrocarbons is formed and a liquid phase comprising water and $C_4$ and heavier hydrocarbons is formed, separating said liquid phase from said vapor phase, heating said vapor phase to at least reforming temperature, and recycling said heated vapor phase to said reformer, and separating said liquid phase into a water layer and a hydrocarbon layer.

10. In the improvement in the method of reforming hydrocarbons as set forth and described in claim 9, the improvement which comprises recycling at least a portion of the water layer to said heat exchanger.

11. In the improvement in the method of reforming hydrocarbon as set forth and described in claim 9, the improvement which comprises adding an anti-freeze to said water layer, and recycling said water layer containing said anti-freeze to said heat exchanger.

12. In the improvement as set forth in claim 9 wherein said separated vapor phase is heated to at least 1200° F.

13. In the method of reforming hydrocarbons wherein a mixture of hydrocarbon and hydrogen-containing gas is contacted in a reformer under reforming conditions of temperature and pressure with particle-form solid reforming catalyst, wherein a reformer effluent is produced, wherein said reformer effluent is cooled to a temperature at which $C_4$ and heavier hydrocarbons condense to form a liquid phase and a vapor phase comprising hydrogen and $C_1$ and heavier hydrocarbons containing in excess of about 4 mol percent $C_4$, $C_5$ and $C_6$ hydrocarbons, and water is formed, wherein said vapor phase is separated from said liquid phase, wherein said vapor phase is heated at least to a reforming temperature, and wherein said heated vapor phase is recycled to said reformer, the improvement which comprises cooling said vapor phase to a temperature at which water and a portion of the $C_4$, $C_5$ and $C_6$ hydrocarbons are condensed to form a second vapor phase containing less than about 4 mol percent $C_4$, $C_5$ and $C_6$ hydrocarbons and having a dew point with respect to water not higher than about $+60°$ F., cooling an absorbent for $C_4$ and heavier hydrocarbons to the temperature of said second vapor phase, contacting said second vapor phase and condensed $C_4$, $C_5$ and $C_6$ hydrocarbons with said cooled absorbent to strip $C_4$, $C_5$ and $C_6$ hydrocarbons from said second vapor phase and to absorb said condensed $C_4$, $C_5$ and $C_6$ hydrocarbons, separating said stripped second vapor phase from said absorbent, heating said stripped second vapor phase to at least reforming temperature, and recycling said heated stripped second vapor phase to said reformer.

14. In the improvement in reforming hydrocarbons as set forth and described in claim 13 the improvement which comprises heating said stripped second vapor phase to at least 1200° F.

15. In the method of reforming hydrocarbons wherein a mixture of hydrocarbons and hydrogen-containing gas is contacted in a reformer with particle-form solid reforming catalyst, wherein a reformer effluent comprising hydrogen, $C_1$ and heavier hydrocarbons, and water is obtained, wherein said reformer effluent is cooled at elevated pressure to a temperature at which $C_4$ and heavier hydrocarbons condense, wherein uncondensed reformer effluent comprising hydrogen, $C_1$ and heavier hydrocarbons, and water is separated from condensed $C_4$ and heavier hydrocarbons, and wherein said separated uncondensed reformer effluent is heated to reforming temperature and recycled to said reformer, the improvement which comprises mixing said uncondensed reformer effluent with an amount of self-cooled second condensate (obtained as hereinafter described) to condensed $C_4$ and heavier hydrocarbons and water and to provide a second uncondensed reformer effluent having a dew point with respect to water not higher than about $+60°$ F. and containing not more than about 4 mol percent of $C_4$, $C_5$ and $C_6$ hydrocarbons and a second condensate comprising said self-cooled second condensate and said condensed $C_4$ and heavier hydrocarbons, separating said second uncondensed reformer effluent having a dew point with respect to water not higher than about $+60°$ F. and containing not more than about 4 mol percent $C_4$, $C_5$ and $C_6$ hydrocarbons from said self-cooled second condensate and said condensed $C_4$ and heavier hydrocarbons, heating said second uncondensed reformer effluent to at least reforming temperature, recycling said heated second uncondensed reformer effluent to said reformer, separating water from said second condensate, reducing the pressure on said second condensate to vaporize a portion thereof and to cool the balance of said second condensate, and cooling at least a portion of said second condensate by indirect heat exchange with a coolant to a temperature at which said cooled second condensate when mixed with said uncondensed reformer effluent the temperature of the mixture is that at which the second uncondensed effluent has a dew point with respect to water not higher than about $+60°$ F.

16. In the improvement as set forth and described in claim 15 the improvement which comprises heating the second uncondensed reformer effluent to at least 1200° F., and recycling said heated second uncondensed reformer effluent to said reformer.

(References on following page)

References Cited in the file of this patent

UNITED STATES PATENTS

| | | |
|---|---|---|
| 2,251,000 | Pyzel | July 29, 1941 |
| 2,271,214 | Welty | Jan. 27, 1942 |
| 2,364,453 | Layng et al. | Dec. 5, 1944 |
| 2,433,603 | Danner et al. | Dec. 30, 1947 |
| 2,663,676 | Cardwell et al. | Dec. 22, 1953 |
| 2,749,287 | Kirshenbaum | June 5, 1956 |
| 2,755,230 | Guernsey | July 17, 1956 |

OTHER REFERENCES

Payne et al.: "Petroleum Refiner," vol. 31, No. 5, May 1952, pp. 117–123.

Payne et al.: "Petroleum Refiner," vol. 24, No. 6, June 1952, pp. C10, C13–18, C20.

UNITED STATES PATENT OFFICE
CERTIFICATE OF CORRECTION

August 4, 1959

Patent No. 2,898,288

Kenneth M. Elliott et al.

It is hereby certified that error appears in the printed specification of the above numbered patent requiring correction and that the said Letters Patent should read as corrected below.

Column 6, line 18, for "content" read -- contents --; column 8, line 35, for "re-run 114" read -- re-run tower 114 --; column 10, line 4, for "direct of indirect" read -- direct or indirect --; column 13, line 28, for "grid 329 leaving" read -- grid 329 and leaving --.

Signed and sealed this 23rd day of February 1960.

(SEAL)
Attest:

KARL H. AXLINE
Attesting Officer

ROBERT C. WATSON
Commissioner of Patents